Jan. 12, 1926.

W. J. GAVEN ET AL 1,569,625

METHOD OF MOLDING PLASTIC MATERIALS

Filed August 15, 1923

INVENTORS
William J. Gaven
and Michael Fried
BY C. P. Goepel
their ATTORNEY

Patented Jan. 12, 1926.

1,569,625

UNITED STATES PATENT OFFICE.

WILLIAM J. GAVEN, OF WILKES-BARRE, PENNSYLVANIA, AND MICHAEL FRIED, OF MOUNT VERNON, NEW YORK; MARY E. GAVEN ADMINISTRATRIX OF SAID WILLIAM J. GAVEN, DECEASED.

METHOD OF MOLDING PLASTIC MATERIALS.

Application filed August 15, 1923. Serial No. 657,555.

*To all whom it may concern:*

Be it known that we, WILLIAM J. GAVEN and MICHAEL FRIED, both citizens of the United States, and residents of Wilkes-Barre, county of Luzerne, and State of Pennsylvania, and Mount Vernon, county of Westchester, and State of New York, have invented certain new and useful Improvements in Methods of Molding Plastic Materials, of which the following is a specification.

This invention relates to an improved method of molding plastic materials and has for its primary object and purpose to provide a method for producing commercial articles, such as doll heads and other toys, sound reproducing records, record cores, amplifying horns, parts of radio receiving and transmitting apparatus, and various other articles where it is desired that the composition material of which the article is formed shall have an outer or exposed surface perfectly smooth and non-porous for the purpose of receiving a suitable paint or coloring composition without further preparation.

Figure 1:
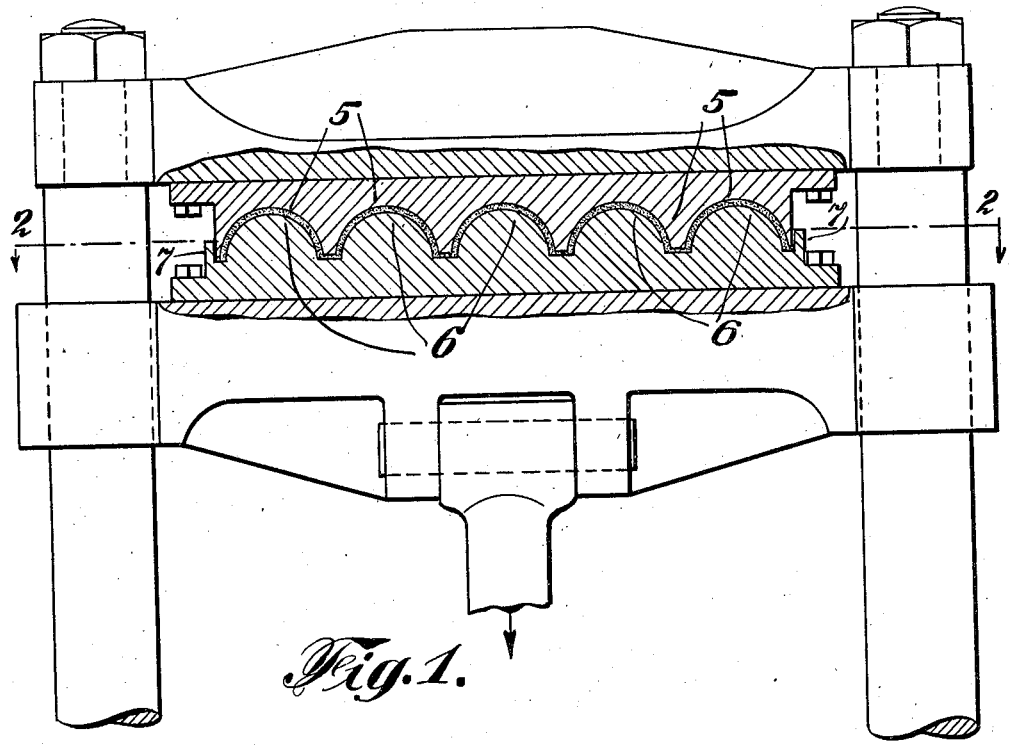
Figure 2:
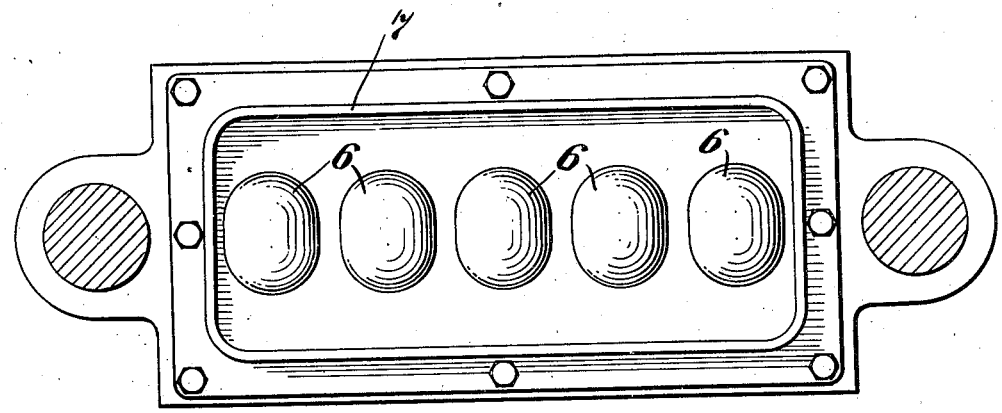

In the accompanying drawing, we have illustrated more or less diagrammatically, sufficient of a molding apparatus such as is used for molding doll heads, whereby the nature of our present improved method may be clearly understood. Fig. 1 is a view, partly in cross section, of such apparatus with the dies thereof arranged in pressing position and Fig. 2 is a plan view of the male die.

In the manufacture of doll heads from plastic composition materials, in the molding apparatus, the female die which forms the exterior or outer surface of the article is in the lower position and is movable with respect to an upper stationary die which forms the interior surface of the doll head. Therefore, it will be understood that in the use of such an apparatus, the composition material is first filled into the cavity of the lower movable female die member which, upon being moved upwardly to receive the stationary male die causes the necessary pressure upon the composition material so that the surplus is exuded therefrom and the exterior surface of the article formed by the wall of the female die member, while the interior surface thereof is formed by the male die member. Each of these die members is provided with suitable heating means so as to maintain the material in the proper plastic condition during the molding operation.

In the use of the method above described, the article upon removal from the female die member invariably has a rough porous outer convex surface and a smooth inner surface. This is believed to be due to the fact that the material is in contact with the heated wall of the female die member for a relatively long period of time so that the outer portion thereof becomes partially baked while the male die member which forms the inner surface of the article is in contact with the material for a very short period of time, not sufficient to completely evaporate all of the moisture and bake this inner wall portion of the article.

It is desirable to obtain a result which is the reverse of that just stated, or in other words, to provide the article with a perfectly smooth non-porous outer surface, although the inner surface thereof is rough and porous.

In the drawing we have shown an apparatus having the male and female molding dies arranged for the purpose of carrying out our new method and it will be observed that the upper female die members 5 are stationary while the lower male die members 6 are movable. Preferably, these latter die members are surrounded by an upstanding wall or flange 7. The die members 5 and 6 are suitably heated as in the prior art apparatus now in general use. The plastic composition material is applied over the male die members either by hand or a suitable mechanical feeding means, the material being confined against lateral flow or spreading by the surrounding flange 7 as the movable male die members are moved upwardly into the cavities of the female die members where pressure is applied to the composition material. The cross-sectional contour of the article is thus produced and since the outer convex surface thereof formed by the female die members is in contact with the walls of said die members for only a short period of time, the composition material will not be subjected to a prolonged heating action, and such surface when the article is removed from the male die member will, therefore, be perfectly smooth and non-porous.

Heretofore, in forming such articles in the manner first explained, it was necessary to dip the outer surface of the article into a suitable composition material to close the pores thereof, and then subject said surface to an abrading operation by the application of sandpaper or other means so as to render the same perfectly smooth, before it was possible to apply the paint or surface finishing composition. Furthermore, after the dipping operation, it was necessary to place the article upon a drying rack where it remains for a period of from twenty-four to forty-eight hours before it was possible to sandpaper the surface. It will be apparent that by means of our new method, these operations and the labor and time incident thereto, are obviated, and as soon as the article is removed from the molding apparatus, the perfectly smooth non-porous outer surface thereof can be immediately painted and finished in the desired colors.

We have found our new method particularly desirable in the manufacture of doll heads from plastic composition materials, but in addition thereto it will be manifest that our improvements might be advantageously used for various other purposes, as in the production of sound reproducing records, amplifying horns, electrical insulation parts, and numerous toys and novelties which are now made from such materials. It is accordingly to be understood that while we have herein described a preferred embodiment of our invention, the same is susceptible of modification in some respects without departing from the essential features thereof. Thus, for instance, in some cases it may not be necessary, in view of the nature of the composition material employed, to heat the die members of the molding apparatus. Also, it will of course be apparent that the form of these die members as shown in the drawing is merely illustrative and our method is applicable for use in connection with various other forms or shapes of these members.

We claim:

1. A method of molding composition materials usually made porous at its outer surface by the prolonged application of heat to form a commercial article having a wall provided with a smooth non-porous exterior surface which consists in first applying the plastic composition material upon the male die member of a molding apparatus, and then subjecting the material to momentary pressure between the wall of said male die member and a complementary female member whereby the outer surface of the molded article formed by the latter die member is in contact with the wall thereof for a relatively short period of time.

2. The herein described method of molding commercial articles from plastic composition materials usually made porous at its outer surface by the prolonged application of heat having a wall provided with a smooth non-porous outer exposed surface which consists in first applying the plastic composition material upon the male die member of a molding apparatus by which the inner surface of the wall of the article is formed, and then moving the male die member into a female die member to compress the plastic material between the walls of said die members, said material contacting with the wall of the female die member forming the outer surface of the article for a relatively short period of time.

3. That method of molding composition materials subject to injury at their outer surfaces by excess of heat when die molded, which consists in first applying the material in plastic condition upon the male die member of a molding apparatus, and then momentarily subjecting the plastic material to pressure between the wall of said male die member and a complementary female member whereby the outer surface of the molded article formed between the die members is in contact with the wall of the female die member for a relatively short period of time.

In testimony that we claim the foregoing as our invention, we have signed our names hereunder.

WILLIAM J. GAVEN.
MICHAEL FRIED.